United States Patent [19]

McNutt

[11] Patent Number: 5,482,271
[45] Date of Patent: Jan. 9, 1996

[54] HUMAN RESTRAINT OR HOBBLE FOR CATCHING AND HOLDING

[76] Inventor: Dennis M. McNutt, 2865 Drake Ave., Costa Mesa, Calif. 92626

[21] Appl. No.: 178,782

[22] Filed: Jan. 7, 1994

[51] Int. Cl.⁶ .......................... F41B 15/02; A01K 15/00
[52] U.S. Cl. .................. 273/84 R; 273/327; 273/419; 43/6; 119/808
[58] Field of Search ................ 273/84 R, 84 ES, 273/32 F, 318, 327, 343, 416, 419–422; 43/6, 59; 119/801, 806, 807, 808, 812, 813; D22/117, 149

[56] References Cited

U.S. PATENT DOCUMENTS

| 465,069 | 12/1891 | Reid | 119/806 |
|---|---|---|---|
| 491,642 | 2/1893 | Griffith | 119/806 |
| 992,906 | 5/1911 | Ross | 119/808 |
| 1,465,267 | 8/1923 | Henry | 43/6 |
| 4,530,310 | 7/1985 | Clarke | 273/84 R |

FOREIGN PATENT DOCUMENTS 75863    1/1952   Denmark ..................... 43/6

Primary Examiner—Vincent Millin
Assistant Examiner—William M. Pierce
Attorney, Agent, or Firm—Roy A. Ekstrand

[57] ABSTRACT

A human restraint or hobble includes an elongated rigid pole having a handle at one end and a clasp at the other end. The clasp is operative to provide a locking grip upon a targeted subject's appendage such as a hand or ankle and once locked thereon, provides secure attachment. In several embodiments, the clasp utilizes a plurality of inwardly extending tines on either side of a U-shaped or V-shaped channel which permit the easy attachment of the clasp while frustrating attempts to remove the clasp. Embodiments are shown utilizing both rigid and flexible tine arrangements. In a still further alternate embodiment, a trigger mechanism is operatively coupled to the tine which releases the tine upon touching the subject thereby locking the clasp to the subject's appendage. In a still further alternate embodiment, the clasp utilizes a pair of pivotally supported jaws together with a trigger release mechanism which provides swift closure of the jaws when the clasp is brought into contact with the user's appendage.

3 Claims, 3 Drawing Sheets

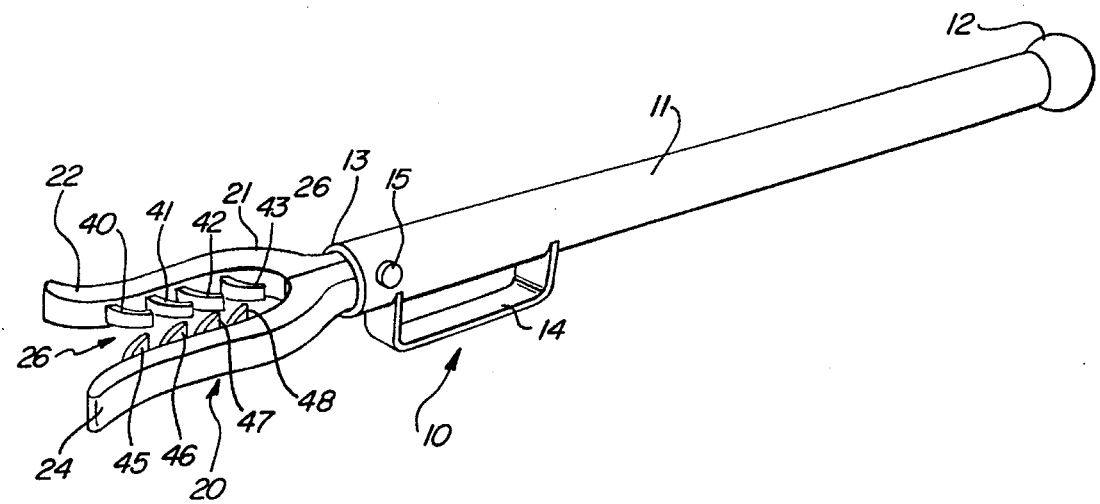
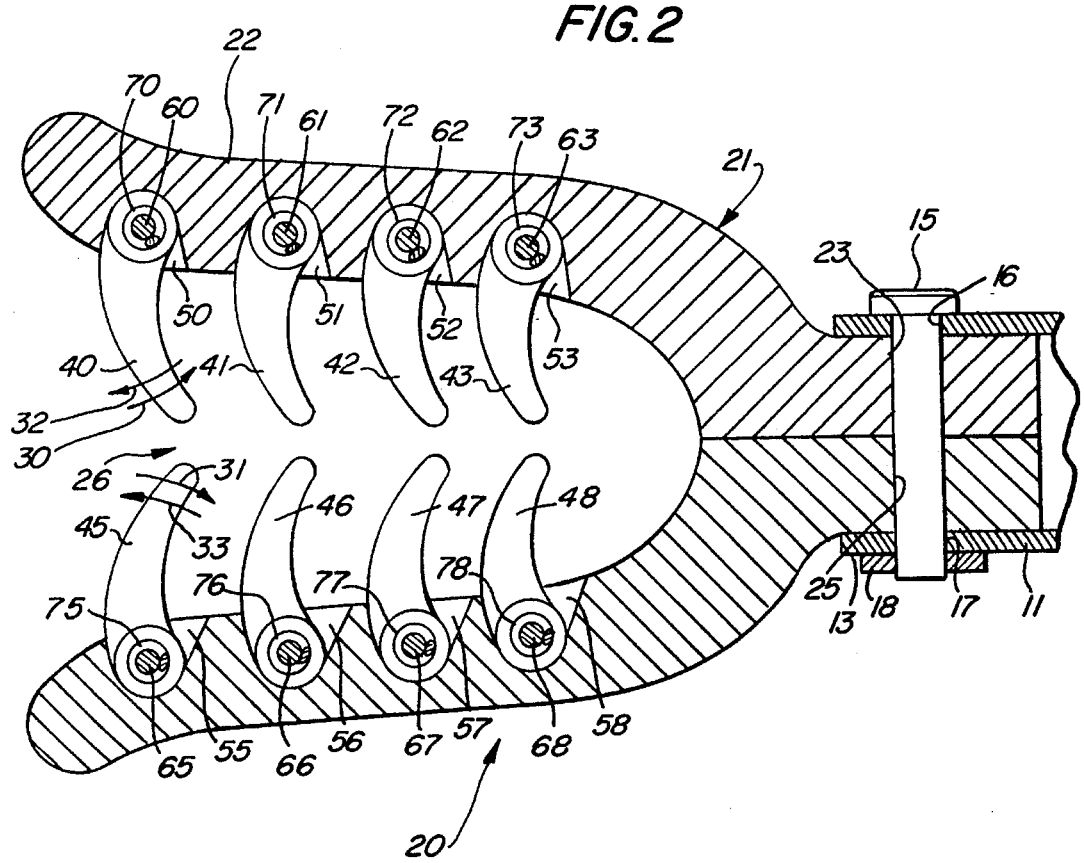

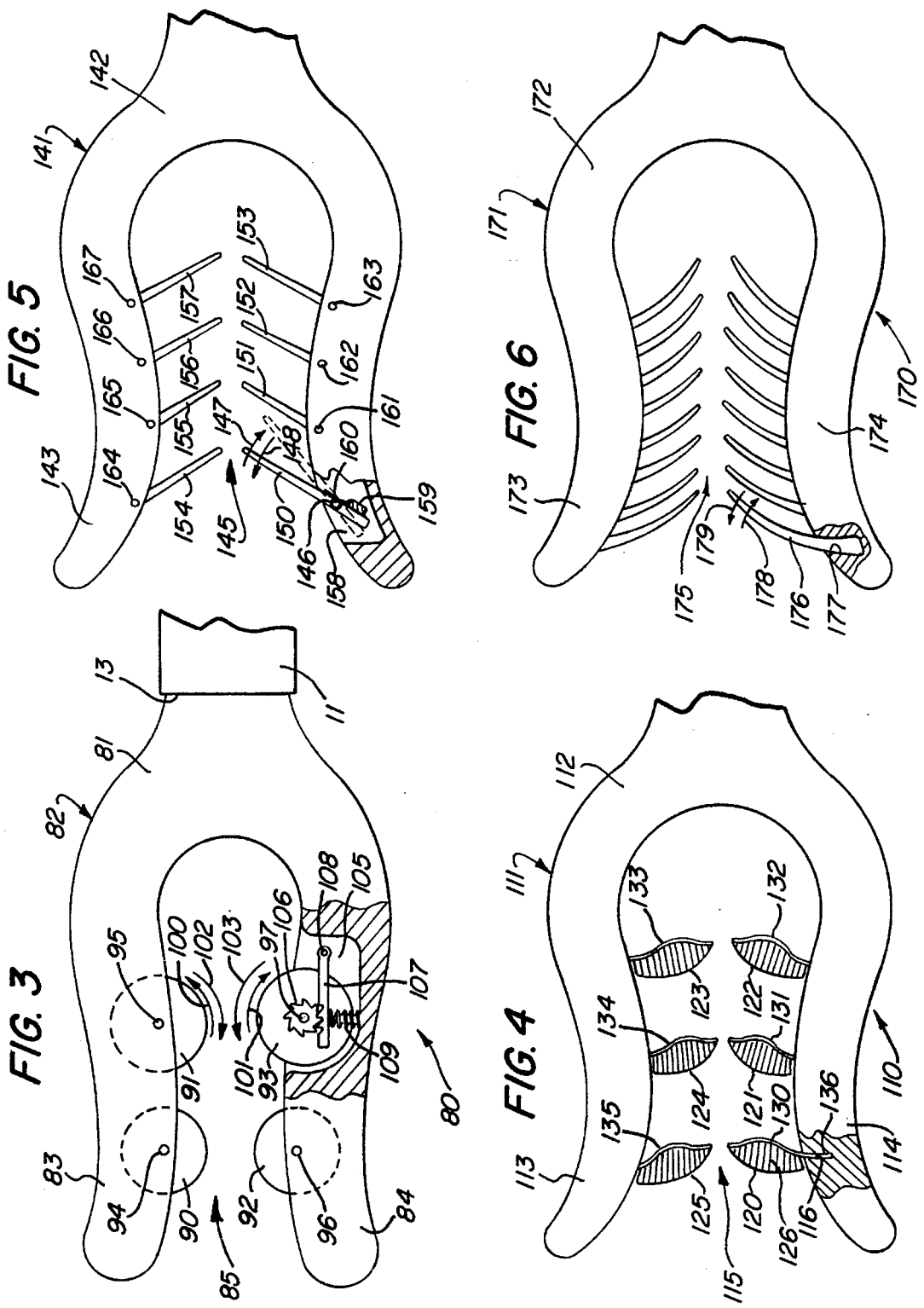

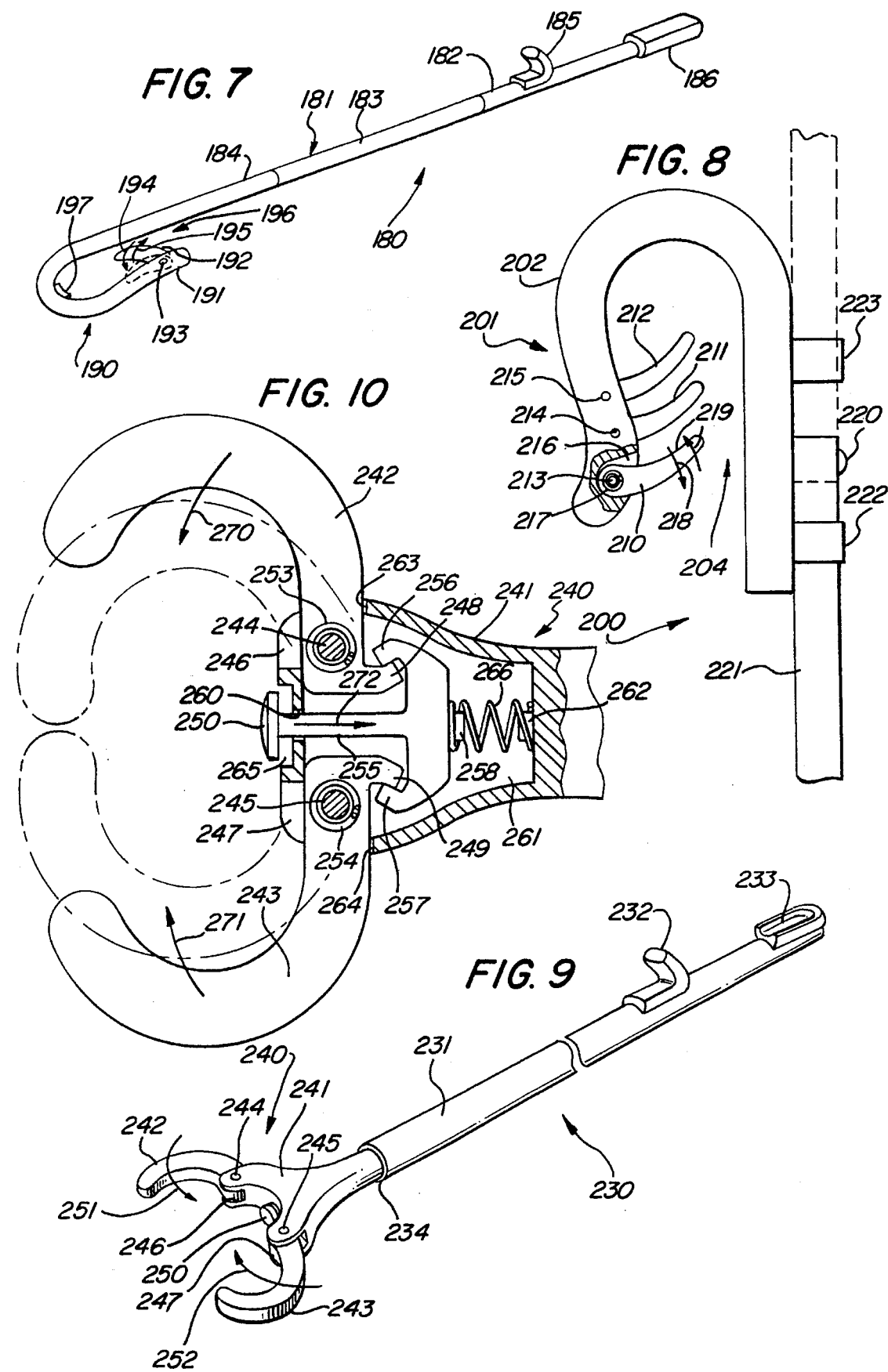

HUMAN RESTRAINT OR HOBBLE FOR CATCHING AND HOLDING

FIELD OF THE INVENTION

This invention relates generally to apparatus used to subdue or restrain a human subject.

BACKGROUND OF THE INVENTION

The process of immobilizing or restraining a resisting subject without causing serious injury to the subject or an arresting officer has been and continues to be one of the most difficult problems facing law enforcement officers. In a typical situation, one or more law enforcement officers are confronted with a hostile often physically aggressive and strong subject who is unwilling to submit to law enforcement officer control. All too frequently, such persons are emotionally distraught, or worse, under the influence of intoxicants or drugs and thus are unable to be dealt with in a reasonable fashion. In such circumstances, public safety and effective law enforcement requires that police officers utilize whatever force is reasonably necessary to subdue and control such an individual. The legal and societal constraints upon police officers in subduing a hostile subject restricts the force exercisable by the police officer and the injury to the subject tolerated.

Similar problems often arise in other circumstances such as the control of patients within mental health facilities, drug treatment facilities, or private security forces employed by property owners to protect customers and property assets.

In attempting to meet the need to provide effective restraint apparatus and subject immobilizing apparatus without imparting serious injury to the subject, practitioners in the art have provided various devices and systems. These attempts have included chemical agent sprays such as the well known mace and pepper spray apparatus in which a pressurized canister contains the mace or pepper spray chemical together with a pressurized vehicle and trigger controlled spray nozzle to facilitate spraying a chemical material upon a subject. Additional devices such as police batons, electric shock prods often called "cattle prods" and devices known as stun guns or tasers have also been provided. Unfortunately, the use of police batons often seriously injures the subject due to the substantial damage required to be caused before a subject becomes immobilized. Similar lack of success has been experienced with electric shock apparatus such as cattle prods, stun guns and tasers, due in part to the insulating effect of outer clothing and the need for precision application for maximum effect.

Additional devices have been provided for law enforcement restraints such as that set forward in U.S. Pat. No. 4,426,079 issued to Mason which sets forth a POLICE RESTRAINT DEVICE utilizing the principle of a second class lever which comprises an arm clamp having two rigid elongated handles or sticks adapted to be held and manipulated manually. A single strong flexible cord or rope of predetermined length extends between the distal ends of the handles to form an integral junction therebetween. Each end of the cord is snugly enclosed with a crimped metal cap or sleeve inserted into a blind or at the distal end of the associated stick.

In a related patent U.S. Pat. No. 4,534,097 also issued to Mason, there is set forth a METHOD OF MAKING A POLICE RESTRAINT DEVICE in which the fabrication of a police restraint device having a pair of handles or sticks having a strong flexible cord or rope extending between the end portions thereof is set forth.

While the foregoing described prior art devices have, in some circumstances, proven adequate and are often used by various law enforcement officers or the like, their success has been extremely limited and a continuing need in the art exists for a more effective humane and less injurious method and apparatus for restraining and immobilizing a resisting subject.

SUMMARY OF THE INVENTION

Accordingly, it is a general object of the present invention to provide an improved human restraint or hobble. It is a more particular object of the present invention to provide an improved human restraint or hobble which avoids serious injury to the resisting subject while facilitating secure control by the law officer. It is a still more particular object of the present invention to provide an improved human restraint or hobble which protects the law enforcement officer from close contact and risk of injury in restraining a hostile resisting subject.

In accordance with the present invention, there is provided for use in grasping an appendage, a restraint comprises: an elongated rigid pole having an end portion; and a clasp supported upon the end portion and secured thereto, the clasp having means for attachment to an appendage.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 1 sets forth a perspective view of a human restraint or hobble constructed in accordance with the present invention;

FIG. 2 sets forth a partially sectioned view of the restraining head portion of the human restraint of FIG. 1;

FIG. 3 sets forth a partially sectioned view of an alternate embodiment of the present invention human restraint;

FIG. 4 sets forth a partial section view of a further alternate embodiment of the present invention;

FIG. 5 sets forth a partial section view of a still further alternate embodiment of the present invention human restraint;

FIG. 6 sets forth a partial section view of a still further alternate embodiment of the present invention human restraint;

FIG. 7 sets forth a perspective view of a still further alternate embodiment of the present invention human restraint;

FIG. 8 sets forth a partial section view of a still further alternate embodiment of the present invention human restraint;

FIG. 9 sets forth a perspective view of a still further alternate embodiment of the present invention human restraint or hobble; and FIG. 10 sets forth a partial section view of the clasp portion of the embodiment of the present invention human restraint set forth in FIG. 9.

DESCRIPTION OF THE PREFERRED EMBODIMENTS

FIG. 1 sets forth a perspective view of a human restraint constructed in accordance with the present invention and generally referenced by numeral 10. Human restraint 10 includes an elongated rigid pole 11 supporting a handle 12 at one end and defining a clasp end 13 at the remaining end. End 13 receives and supports a clasp assembly 20 having a frame 21 formed of a tine support 22 and a tine support 24. As is better seen below in FIG. 2, tine supports 22 and 24 form mirror image elements which are joined to form frame 21 and which are received within clasp end 13 of pole 11. Tine support 22 supports a plurality of curved tines 40, 41, 42 and 43 while tine support 24 supports a corresponding plurality of curved tines 45, 46 and 47. Frame 21 forms a receiving channel 26 between tine supports 22 and 24. A lock pin 15 extends through clasp end 13 of pole 11 and is received within apertures 23 and 25 of tine supports 22 and 24 (seen in FIG. 2). Restraint 10 further includes an elongated rigid skid member 14 secured to the underside of pole 11 near clasp end 13.

The support structure of tines 40 through 43 and tines 45 through 48 within tine supports 22 and 24 respectfully is set forth below in greater detail. However, suffice it to note here that tines 40 through 43 and 45 through 48 are pivotally secured to tine support 22 and 24 such that each tine is capable of pivoting inwardly toward the end of channel 26 in response to very light pressure. In addition, each tine is spring-biased to the extended position shown in FIG. 1 such that the tines tend to meet in opposed pairs and tend to block channel 26. Thus, tines 40 through 43 and tines 45 through 48 cooperate to form a locking or grasping mechanism which permits an appendage of a target subject, such as a wrist or an ankle, to easily pass inwardly into channel 26 as tines 40 through 43 and 45 through 48 easily pivot and thereafter lock or restrain the appendage within channel 26 due to the inability of tines 40 through 43 and tines 45 through 48 to pivot in the outward direction beyond the position shown in FIG. 1.

In operation and in accordance with an important aspect of the present invention, a law enforcement officer or the like is able to utilize restraint 10 by securely grasping pole 11 near handle 12 and directing clasp 20 toward the target appendage of the resisting subject. If, for example, the law enforcement officer targets an ankle of a resisting subject, the officer is able to extend pole 11 outwardly and downwardly to align channel 26 of clasp 20 with the subject's ankle. In this operation, skid 14 is operative to space clasp 20 above the underlying ground surface upon which the subject is standing to assure that clasp 20 is aligned with the user's ankle and is above and clear of the target subject's foot. Once the law enforcement officer has aligned clasp 20 with the subject's ankle, a quick forward movement passes clasp 20 above the user's ankle through channel 26 as tines 40 through 43 and tines 45 through 48 pivot in the manner described below and spring back to the position shown in FIG. 1 to enclose the subject's ankle in a secure attachment.

In accordance with an important aspect of the present invention, the length of rigid pole 11 serves to facilitate the attachment of clasp 20 to the user's ankle while permitting the law enforcement officer to maintain a safe distance from the subject. It will be apparent to those skilled in the art that the length of pole 11 is selected in accordance with the particular preferences and characteristics of the law enforcement officer as well as the operating circumstances. Suffice it to note here, however, that the rigid character of pole 11 permits a significant safety margin for the officer in attaching clasp 20.

Once clasp 20 is engaged, the desired effect is to produce compliance in the subject as the clear restraint and control exercisable by the law enforcement officer becomes apparent to the subject. Using pole 11 with clasp 20 secured to an appendage such as an ankle, the law enforcement officer is able to exercise great control upon the subject. If, however, the subject continues to resist, the law enforcement officer has several options available due to the unique design and structure of human restraint 10. For example, the officer may be able to manipulate restraint 10 so as to maneuver the subject off balance and ultimately cause the subject to be tripped up or fall to the ground surface. Alternatively, the officer may choose to simply release pole 11 leaving clasp 20 and pole 11 secured to the subject's ankle. In this method of use, restraint 10 becomes a substantial hobble operative upon the subject which renders rapid flight or retreat virtually impossible. Should the subject attempt to run or attack when restraint 10 is attached, it is likely that the subject would immediately stumble and fall and hopefully surrender, realizing escape is impossible.

Once the subject is further restrained using conventional restraints such as hand or leg cuffs or the like, the officer may remove restraint 10 by unlocking pin 15 to permit its removal from pole 11. Lock pin 15 is constructed in accordance with conventional fabrication techniques and, in its preferred form, is removable through the use of a key or specially designed removal tool to permit lock pin 15 to be withdrawn from pole 11. Once lock pin 15 is removed from pole 11, clasp 20 is removable from clasp end 13 of pole 11 facilitating the separation of tine supports 22 and 24 to free the subject's appendage.

FIG. 2 sets forth a partial section view of clasp 20 showing the operative structure of tines 40 through 43 and tines 45 through 48. As described above, clasp 20 includes a pair of tine supports 22 and 24 forming mirror image elements joined to form a frame 21 defining a receiving channel 26 therein. Tine supports 22 and 24 are fitted within end 13 of pole 11 and secured by a lock pin 15. To accommodate lock pin 15, pole 11 defines a pair of aligned apertures 16 and 17 and a conventional lock mechanism 18. It will be recognized by those skilled in the art that lock pin 15 and lock mechanism 18 may be constructed in accordance with conventional fabrication techniques with the desired feature thereof being the ability of lock pin 15 to be securable to pole 11 and removable therefrom.

Tine support 22 further defines a plurality of recesses 50 through 53 which receive tines 40 through 43 respectively. Tines 40 through 43 are pivotally secured within recesses 50 through 53 by a plurality of cylindrical pins 60 through 63 respectively. A plurality of coil springs 70 through 73 are coupled to tines 40 through 43 respectively to provide spring forces which urge tines 40 through 43 in the clockwise direction indicated by arrow 32 to the extended position shown in FIG. 2.

Correspondingly, tine support 24 defines a plurality of recesses 55 through 58 which receive tines 45 through 48 respectively in a pivotal attachment provided by pins 65 through 68 respectively. A plurality of coil springs 75 through 78 are coupled to tines 45 through 48 respectively to provide spring forces which urge tines 45 through 48 in the counterclockwise pivotal direction indicated by arrow 33.

In accordance with an important aspect of the present invention, tines 40 through 43 and 45 through 48 extend outwardly in the position shown in FIG. 2 in the absence of an object such as a subject appendage being moved into channel 26. In further accordance with the present invention, however, as clasp 20 is moved forwardly against a subject's appendage such as an ankle or wrist, tines 40 through 43 easily pivot in the direction indicated by arrow 30 while tines 45 through 48 pivot in the direction indicated by arrow 31 to permit clasp 20 to move upon and receive the subject's appendage within channel 26. As the subject's appendage moves past an opposed set of tines, the return springs operative thereon return each of the tines to the extended position shown in FIG. 2 locking the subject's appendage in place within channel 26.

In its preferred form, tines 40 through 43 and 45 through 48 are fabricated of a material sufficiently strong to resist the subject's attempts to withdraw the grasped appendage while at the same time being structured to minimize injury to the subject. Accordingly, it should be noted that the end portions of tines 40 through 43 and 45 through 48 are rounded to reduce the likelihood of injury to the subject.

FIG. 3 sets forth a partial section view of an alternate embodiment of the present invention human restraint generally referenced by numeral 80. Restraint 80 includes a pole 11 which is preferably fabricated in the manner set forth above in FIG. 1 and which defines an end 13. Restraint 80 further includes a clasp 82 having a generally U-shaped or V-shaped frame 81 received within end 13 of pole 11 in a secure attachment or, alternatively, in the removable attachment set forth above for clasp 20 secured to pole 11 (seen in FIG. 1). Frame 81 includes a pair of mirror image wheel support members 83 and 84 spaced apart and defining an interior channel 85 therebetween. A plurality of wheels 90, 91, 92 and 93 are rotatably secured to wheel supports 83 and 84 by a plurality of support pins 94, 95, 96 and 97 respectively. As can be seen in FIG. 3, wheels 90 through 93 are partially received within wheel supports 83 and 84 and extend inwardly into channel 85 to provide partial closure and obstruction of channel 85. The partial section view of FIG. 3 sets forth the operative mechanism supporting and securing wheel 93. It will be understood by those skilled in the art that wheels 90 through 92 are similarly supported and include similar operative mechanisms to function in the manner described in detail for wheel 93. More specifically, wheel support 84 defines an interior recess 105 within which wheel 93 is freely movable and partially exposed extending into channel 85. A pin 97 extends through an aperture (not shown) within the center of wheel 93 to provide a rotational support within recess 105 for wheel 93. A ratchet gear 106 is secured to wheel 93 and defines a plurality of nonsymmetrical teeth having extended slopes in one direction and abrupt sharp slopes in the remaining direction. A ratchet pawl 107 is pivotally secured within recess 105 by a pin 108. Ratchet pawl 107 defines a plurality of nonsymmetrical teeth positioned opposite ratchet gear 106. A ratchet spring 109 is coupled within recess 105 and exerts a spring force against ratchet pawl 107 urging teeth 104 into engagement with gear 106.

The operation of wheel 93, ratchet gear 106, ratchet pawl 107 and spring 109 provides a ratcheted action or single direction rotation for wheel 93. Thus, as wheel 93 is rotated in the clockwise direction indicated by arrow 101, the sloped facets of gear 106 and teeth 104 of ratchet pawl 107 are able to slide past each other as spring 109 is compressed. Conversely, in the event wheel 93 is urged to rotate in the counterclockwise direction indicated by arrow 103, the sharp facets of gear 106 and teeth 104 are brought into interfering contact and rotational motion in the direction of arrow 103 of wheel 93 is prohibited. Thus, wheel 93 freely rotates in the direction indicated by arrow 101 and is locked to prevent rotation in the direction indicated by arrow 103.

As mentioned above, wheels 90, 91 and 92 are similarly supported within wheel supports 83 and 84 and include corresponding ratchet mechanisms operative thereon. As a result, as clasp 82 is thrust forwardly to force a subject's appendage such as ankle or wrist into channel 85, the inward motion of the subject's appendage is freely permitted as wheels 90 through 93 freely rotate to facilitate the movement of the subject's appendage into the rear portion of channel 85. The opposite direction motion necessary to remove the subject's appendage from channel 85 is however precluded as the ratchet mechanisms within wheels 90 through 93 are locked. It will be apparent to those skilled in the art that wheels 90 and 91 supported on one side of channel 85 must be oppositely oriented in their ratcheting action with respect to the ratcheting action operative upon wheels 92 and 93. Thus, for example, wheel 91 includes a ratchet mechanism identical to that shown for wheel 93 with the understanding the ratchet teeth are operative to permit rotation of gear 91 in the direction indicated by arrow 100 while locking to prohibit rotation in the direction indicated by arrow 102. A similar relationship exists between wheels 90 and 92.

In their preferred form, wheels 90 through 93 are fabricated of a hard somewhat yielding rubber material or the like which yields slightly as the subject's appendage is rolled into channel 85 of clasp 82 but which exhibits sufficient strength and resilience to preclude the subject's withdrawal of the appendage once the wheels have locked.

It will be apparent to those skilled in the art that while restraint 80 is shown having a set of four rotatable wheels, different combinations of wheels and wheel numbers may be utilized without departing from the spirit and scope of the present invention. It will be equally apparent that the ratchet mechanism operative upon wheels 90 through 93 is illustrative of a general group of ratchet mechanisms any of which may be utilized in the present invention.

FIG. 4 sets forth a partially sectioned view of a still further alternate embodiment of the present invention generally referenced by numeral 110. Restraint 110 includes a clasp 111 having a generally U-shaped frame 112. Frame 112 is receivable within pole 11 in the manner set forth above for frame 81 in FIG. 3. Frame 112 defines a pair of mirror image tine supports 113 and 114 spaced apart to form an interior channel 115 therebetween. Clasp 111 further includes a plurality of inwardly extending tines 120 through 125 having a plurality of resilient support springs 130 through 135 respectively. In the partial section view of FIG. 4, the structural details of the attachment for tine 120 are shown. It will be understood by those skilled in the art that the remaining tines 121 through 125 are similarly structured and secured within frame 112 in a similar manner. Thus, tine support 114 defines an angled aperture 116 which receives an extending end portion 136 of spring 130. End 136 of spring 130 may be secured within aperture 116 using conventional fabrication techniques such as adhesive bonding or the like. Tines 120 through 125 are preferably fabricated of a resilient hard rubber material or the like and are secured to springs 130 through 135 respectively using conventional fabrication techniques such as adhesive attachment or the like.

As is shown in detail for tine 120, a plurality of serrations 126 are formed within tine 120 to divide tine 120 into a plurality of closely packed finger-like rubber elements. Tines 121 through 125 are similarly structured and define respective pluralities of closely spaced serrations therein.

In operation, as clasp 111 is moved forwardly upon a subject appendage such as ankle or wrist forcing the appendage into channel 115 toward the closed end thereof, springs 130 through 135 of tines 120 through 125 flex inwardly as the appendage is forced against each tine. During this flexing action, the serrations formed within tines 120 through 125 separate facilitating the flexing action of springs 130 through 135. In addition, the flexing action of the serrated portions of tines 120 through 125 provides a substantially easier inward motion of the subject appendage into channel 115. Thus, motion into channel 115 for the subject's appendage is relatively easy and only slightly obstructed.

Conversely, once the user's appendage has been moved into channel 115 past tines 120 through 125, the opposite direction outward motion is greatly inhibited due to the structure of tines 120 through 125 and springs 130 through 135. Whereas, the serrations within tines 120 assisted in the inward movement of the subject's appendage by separating, attempted outward motion causes tines 120 through 125 to be compressed and the serrations closed which resists flexing in the outward direction of tines 120 through 125. As a result, the user's appendage is securely trapped within clasp 111.

FIG. 5 sets forth a partial section view of a still further alternate embodiment of the present invention restraint generally referenced by numeral 140. Restraint 140 includes a clasp 141 having a generally U-shaped or V-shaped frame 142. Frame 142 is securable to a rigid pole such as pole 11 in the manner described above. Frame 142 further defines a pair of mirror image tine supports 143 and 144 spaced apart to define an interior closed end channel 145. Clasp 141 further includes a plurality of elongated tines 150 through 157 extending inwardly from tine supports 143 and 144 to form an angular inwardly oriented symmetrical array. A plurality of pins 160 through 167 extend through tine supports 143 and 144 and provide pivotal attachment of tines 150 through 157. Tine 150 through 157 are secured within tine supports 143 and 144 in the arrangement shown for tine 150 in detail. Thus, more specifically, tine support 144 defines an interior channel 158 extending past tines 150 through 153. A limit stop 159 extends through interior channel 158 to limit the pivotal motion of tine 150 in the direction indicated by arrow 148 to the angled position shown in FIG. 5. A coil spring 146 encircles pin 160 and is coupled between tine support 144 and tine 150 to urge tine 150 in the direction indicated by arrow 150. By similar mechanisms, tines 151 through 157 are pivotally supported within tine supports 143 and 144 and are spring-biased to the positions shown in FIG. 5 and include respective limit stops similar to limit stop 159 operative upon tine 150.

In operation, the respective return springs operative upon tines 150 through 157 position tines 150 through 157 in the alignment shown in FIG. 5. As the law enforcement officer forces clasp 141 onto a subject's appendage such as ankle or wrist, tine 150 is pivoted in the direction indicated by arrow 147 overcoming the force of return spring 146. A similar pivoting action occurs in tine 154 as the law enforcement officer drives clasp 141 onto the subject's appendage. The remaining tines also pivot as they encounter the subject's appendage and permit the inward movement of the subject's appendage as clasp 141 is applied. Once clasp 141 has received the subject's appendage within channel 145, the removal of the subject's appendage is precluded by the limited motions of tines 150 through 157 due to their respective limit stops in the manner shown for tine 150 and limit stop 159. As a result, the user's appendage is trapped within channel 145.

FIG. 6 sets forth a partially sectioned view of a still further alternate embodiment of the present invention human restraint generally referenced by numeral 170. Restraint 170 includes a clasp 171 received upon pole 111 in the manner described above. Clasp 171 includes a generally U-shaped or V-shaped frame 172 having a pair of mirror image spaced apart tine supports 173 and 174 forming a closed end channel 175 therebetween. Clasp 171 further includes a plurality of slightly curved resilient tines 176 secured to tines supports 173 and 174 in an inwardly curved symmetrical array. For purposes of illustration, the partial section view of FIG. 6 shows an aperture 177 formed within tine support 174. Aperture 177 receives the interior end of one of tines 176 in a conventional attachment such as adhesive bonding or the like. While not shown in FIG. 6, it will be apparent to those skilled in the art that corresponding apertures such as aperture 177 are formed within tine supports 173 and 174 to receive the end portions of respective ones of tines 176 to support the tine array.

In operation, as clasp 171 is forced upon a subject's appendage, tines 176 readily flex inwardly in the direction indicated by arrow 178 permitting easy motion of the subject's appendage into channel 175. The curved resilient structures of tines 176 however preclude opposite direction motion in the direction indicated by arrow 179 as the user attempts to withdraw the appendage from clasp 171. Thus, clasp 171 entraps and secures the subject's appendage. In their preferred form, tines 176 are rounded at their respective end portions to avoid presenting a sharp point to the subject's appendage and thereby avoid injury to the subject.

FIG. 7 sets forth a perspective view of a still further alternate embodiment of the present invention human restraint generally referenced by numeral 180. Restraint 180 includes an elongated generally cylindrical pole 181 formed of a plurality of separate segments 182, 183 and 184 which may telescope for storage. Segments 182 supports a handle grip 185 and an elbow pad 186. Segment 184 is formed to define a generally U-shaped or V-shaped clasp 190 having a tine support 191 at the curved end thereof. A pivotally movable tine 192 is secured to tine support 191 by a pivot pin 193. Tine 192 is pivotable in the direction indicated by arrow 194 and is maintained in the position shown by a return spring (not shown) which urges tine 192 in the direction indicated by arrow 195. A trigger 197 is supported within the interior portion of channel 196 formed in clasp 190. A conventional release mechanism (not shown) is coupled between trigger 197 and tine 192 to lock tine 192 in the dashed-line position shown. When trigger 197 is depressed, tine 192 is released and driven outwardly in the direction indicated by arrow 195 to clasp or trap a subject's appendage.

In operation, the law enforcement officer grasps handle 185 and aligns his or her elbow with elbow pad 186 to control restraint 180. Thereafter, restraint 180 is used by moving clasp 190 beyond the subject's appendage and drawing restraint 180 rapidly toward the law officer moving the subject's appendage through channel 196 to touch trigger 197. Once trigger 197 is touched, tine 192 is released and springs outwardly to the position shown in solid-line representation in FIG. 7. As a result, the subject's appendage is trapped within clasp 190.

FIG. 8 sets forth a still further alternate embodiment of the present invention human restraint generally referenced by numeral 200. Restraint 200 includes a clasp 201 having a generally U-shaped or V-shaped frame 202. Frame 202 defines a curved tine support 203. A plurality of curved tines 210, 211 and 212 are pivotally secured within tine support 203 by a plurality of pivot pins 213, 214 and 215 respectively. Tine support 203 defines a recess 216 which receives the interior end of tine 210 in the pivotal attachment shown using pin 213. A coil spring 217 is received upon pin 213 and is coupled to tine 210 to provide a spring force urging tine 210 in the direction indicated by arrow 218 to the position shown in FIG. 8. While not seen in FIG. 8, it will be understood that tine support 203 further defines similar recesses to recess 216 which receive the interior ends of tines 211 and 212. It will be further understood that a pair of coil springs such as spring 217 are operative upon tines 211 and 212 in the manner described for tine 210. Frame 201 defines a channel 204 and is pivotally secured to a rigid pole 221 by a pivot pin 220. A pair of spring clamps 222 and 223 are secured to the outer surface of frame 202 in the position shown. In the configuration shown in FIG. 8, pole 221 is pivoted about pin 220 and snap-fitted within spring clamp 222 to maintain the alignment of pole 221 and frame 202 shown in FIG. 8. In this alignment, the law enforcement officer is able to clasp a user's appendage by operation similar to that described above in the embodiment of FIG. 7 in which pole 221 is manipulated to move clasp 201 beyond the subject's appendage and thereafter rapidly draw pole 221 and clasp 201 toward the law enforcement officer moving the subject's appendage through channel 204 and into frame 202. As the subject's appendage moves through channel 204, tines 210 through 212 pivot in the direction indicated by arrow 219 afterwhich they return quickly to the extended position shown due to the action of their respective return springs such as spring 217 operative upon tine 210.

In an alternate use of restraint 200, pole 221 is separated from spring clamp 222 by pivoting pole 221 with respect to frame 202 and realigning pole 221 to the dashed line position shown in which pole 221 is received within spring clamp 223. This pivotal reorientation of pole 221 permits restraint 200 to be utilized in a forward thrusting operation similar to that described above in the previous embodiments. This, of course, greatly increases the flexibility of use of the present invention human restraint.

FIG. 9 sets forth a partially sectioned perspective view of a still further alternate embodiment of the present invention human restraint generally referenced by numeral 230. Restraint 230 includes an elongated cylindrical pole 231 supporting a hand grip handle 232 and an elbow pad 233 thereon. Pole 231 is preferably rigid and defines an end 234. Restraint 230 further includes a clasp 240 having a frame 241 received within end 234 of pole 231 by conventional fabrication techniques. Frame 241 defines a pair of slots 246 and 247 within which a pair of curved jaws 242 and 243 are pivotally supported by a pair of pins 244 and 245 respectively. By means set forth below in greater detail, jaws 242 and 243 are pivotable inwardly in the directions indicated by arrows 251 and 252 under the urging of a pair of closure springs. A trigger button 250 is supported upon frame 241 and is by means set forth below in FIG. 10 in greater detail operatively coupled to jaws 242 and 243 to maintain jaws 242 and 243 in the open position shown so long as trigger button 250 remains undisturbed. In the event trigger button 250 is depressed, however, jaws 242 and 243 are released and spring inwardly in the directions indicated by arrows 251 and 252 and are locked in the closed position in the manner described below.

In operation, with jaws 242 and 243 separated in the open position shown in FIG. 9, the law enforcement officer then thrusts clasp 240 against the appendage of the subject causing trigger button 250 to be depressed by contact with the subject's appendage. The pressure upon trigger button 250 releases the lock mechanism operative upon jaws 242 and 243 permitting the jaws to snap inwardly and lock to secure the subject's appendage and firmly apply clasp 240 to the subject.

FIG. 10 sets forth a partial section view of clasp 240 of restraint 230. As described above, clasp 240 includes a frame 241 defining a pair of slots 246 and 247. Frame 241 further defines an interior recess 261 having an inwardly extending post 262 formed therein. Frame 241 further defines a recess 265 and an aperture 260. A trigger button 250 is received within recess 265 and is coupled to an inwardly extending shaft 255. Shaft 255 is further coupled to a pair of outwardly extending lock tabs 256 and 257 together with an inwardly extending post 258. The latter is generally aligned with post 262 of frame 241. A coil spring 266 is received upon post 262 and 258 producing a spring force urging trigger button 250 outwardly from frame 241.

A pair of curved jaws 242 and 243 are received within slots 246 and 247 and are pivotally secured within recess 261 of frame 241. Jaws 242 and 243 further define lock tabs 248 and 249 extending beneath lock tabs 256 and 257. A pair of coil springs 253 and 254 are operatively coupled to jaws 242 and 243 producing spring forces which urge jaws 242 and 243 toward closure in the direction indicated by arrows 270 and 271 respectively.

In the locked position shown in FIG. 10, spring 266 urges lock tabs 256 and 257 into contact with lock tabs 248 and 249 of jaws 242 and 243 respectively. With lock tabs 256 and 257 thus positioned, they engage lock tabs 248 and 249 respectively thereby preventing jaws 242 and 243 from pivoting toward closure.

Once trigger button 250 is pushed in the above-described operation as a law enforcement officer forces clasp 240 against a subject's appendage, however, the spring force of spring 266 is overcome permitting trigger button 250 and shaft 255 to move inwardly in the direction indicated by arrow 272. As button 250 and shaft 255 move inwardly, tabs 256 and 257 are moved out of locking engagement with tabs 248 and 249 thereby releasing jaws 242 and 243 and permitting closure thereof. As jaws 242 and 243 pivot in the directions indicated by arrows 270 and 271, lock tabs 248 and 249 pivot correspondingly moving to the opposite sides of lock tabs 256 and 257. Thereafter, the spring force of spring 266 forces lock tabs 256 and 257 against the opposite sides of tabs 248 and 249 thereby securing jaws 242 and 243 in the closed position to complete the grasp and lock upon the subject's appendage.

What has been shown is a new and inventive human restraint or hobble which utilizes a rigid pole upon which a clasp is supported to permit a law enforcement officer or the like to engage a hostile resisting subject while maintaining a safe separation distance from the subject. The rigid pole is used to position the clasp in proper alignment with the subject's appendage afterwhich the clasp engages the subject's appendage locking the restraint thereto. With the clasp securely engaging the subject's appendage, the law enforcement officer is able to pursue various alternative tactics including tripping the subject by manipulating the pole or simply releasing the restraint and allowing the secured restraint to function as a hobble to discourage the subject from further resistance, flight or attack.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. For use in releasibly grasping an appendage, a restraint comprising:

an elongated rigid pole having an end portion;

a clasp formed of a generally rigid material secured to said end and defining first and second spaced apart tine supports forming a closed end appendage receiving channel between said first and second spaced apart tine supports;

first and second pluralities of tines pivotally supported upon said first and second tine supports respectively, said tines each being independently movable with respect to said tine supports between a first position forming an acute angle with its respective tine support and a second position generally parallel to its respective tine support; and a plurality of spring means, each operative independently upon one of said tines, for urging said individual tines toward said first position.

2. For use in grasping an appendage of a resisting subject, a restraint comprising:

a clasp formed of a pair of spaced apart tine supports joined to define an appendage receiving channel between said spaced apart tine supports;

appendage grasping means including a plurality of inwardly extending pivotable tines supported proximate said channel upon each of said spaced apart portions operative to facilitate low resistance insertion of said appendage into said channel and to prevent withdrawal therefrom;

a pole having a first end coupled to said clasp and a second end remote from said first end; and removal means for releasibly securing said pair of tine supports to said first end of said pole.

3. A restraint as set forth in claim 1 wherein said clasp is formed of a pair of mirror-image elements commonly joined to said end of said pole in a releasible attachment which facilitates separation of said mirror-image elements and release of an appendage grasped within said restraint.

\* \* \* \* \*